US 6,639,760 B2

(12) United States Patent  (10) Patent No.: US 6,639,760 B2
Dyer et al.  (45) Date of Patent: Oct. 28, 2003

(54) COMPLIANT WORM GEAR AND WORM GEAR BRACKET

(75) Inventors: William Marvin Dyer, San Jose, CA (US); James Howard Eaton, Morgan Hill, CA (US); David Howard Flores Harper, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 10/041,864

(22) Filed: Jan. 7, 2002

(65) Prior Publication Data

US 2003/0128476 A1 Jul. 10, 2003

(51) Int. Cl.[7] .............................. G11B 5/55; G11B 21/08
(52) U.S. Cl. ................................. 360/261.3; 360/261.1; 360/291.2
(58) Field of Search ........................... 360/261.1, 261.3, 360/291, 291.2, 75, 77.12, 78.02; 74/424.94, 425, 427, 409

(56) References Cited

U.S. PATENT DOCUMENTS

| 3,735,645 | A | | 5/1973 | Pickles ......................... 74/606 |
| 4,333,116 | A | * | 6/1982 | Schoettle et al. ......... 360/78.02 |
| 4,609,959 | A | * | 9/1986 | Rudi ......................... 360/261.3 |
| 5,414,578 | A | * | 5/1995 | Lian et al. .................. 360/291 |
| 5,706,149 | A | * | 1/1998 | Hoelsaeter ............... 360/261.3 |
| 5,726,834 | A | * | 3/1998 | Eckberg et al. .......... 360/261.1 |
| 5,794,480 | A | | 8/1998 | Schonsteiner ................ 74/425 |
| 5,862,014 | A | * | 1/1999 | Nute ........................... 360/291 |
| 5,886,437 | A | | 3/1999 | Bohn et al. .................... 310/90 |
| 5,949,619 | A | * | 9/1999 | Eckberg et al. ............. 360/291 |
| 5,993,095 | A | | 11/1999 | Harris ..................... 400/636.2 |
| 6,016,716 | A | | 1/2000 | Mauro .......................... 74/409 |
| 6,307,718 | B1 | * | 10/2001 | Kasetty ................... 360/291.1 |
| 6,556,385 | B2 | * | 4/2003 | Nawa ....................... 360/261.3 |

FOREIGN PATENT DOCUMENTS

| DE | 3834691 A | | 10/1988 | |
| JP | 60084561 A | | 5/1985 | |
| JP | 06195661 A | * | 7/1994 | ............ G11B/5/56 |
| JP | 6249882 A | | 9/1994 | |
| JP | 9187339 | | 7/1997 | |
| JP | 10206088 A | | 8/1998 | |

* cited by examiner

Primary Examiner—William Klimowicz
(74) Attorney, Agent, or Firm—Robert O. Guillot; IPLO Intellectual Property Law Offices

(57) ABSTRACT

A mechanical linkage, including a worm gear and a worm gear support bracket, for joining a drive motor to a helical gear; it is particularly adapted for controlling a tape drive head. The worm gear head is threadably engaged with the helical gear. The shaft of the worm gear is engaged with the motor and is sufficiently flexible to operably correct misalignments between the worm gear shaft and the motor shaft. The support bracket includes a flat leaf spring which provides lateral spring force against the worm gear shaft to maintain a driving engagement between the worm gear and the helical gear, while the leaf spring is stiff in the in-plane directions of movement. The support bracket also includes a bushing, such as a C-shaped bushing or a cylindrical bushing, which provides support for the worm gear shaft against the helical gear.

12 Claims, 2 Drawing Sheets

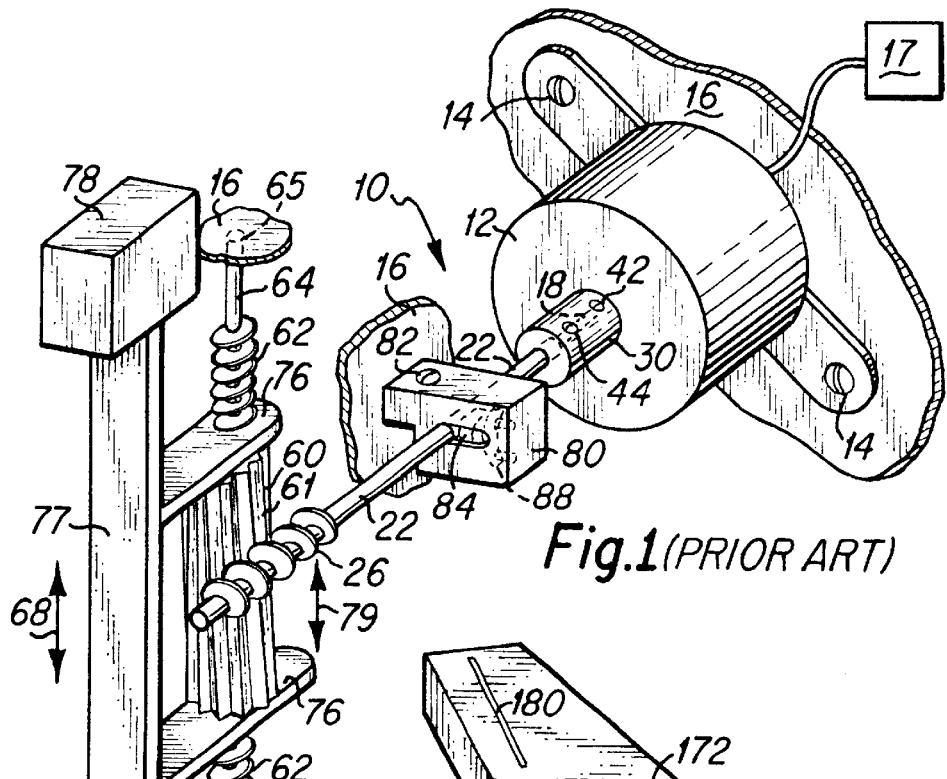
Fig.1 (PRIOR ART)
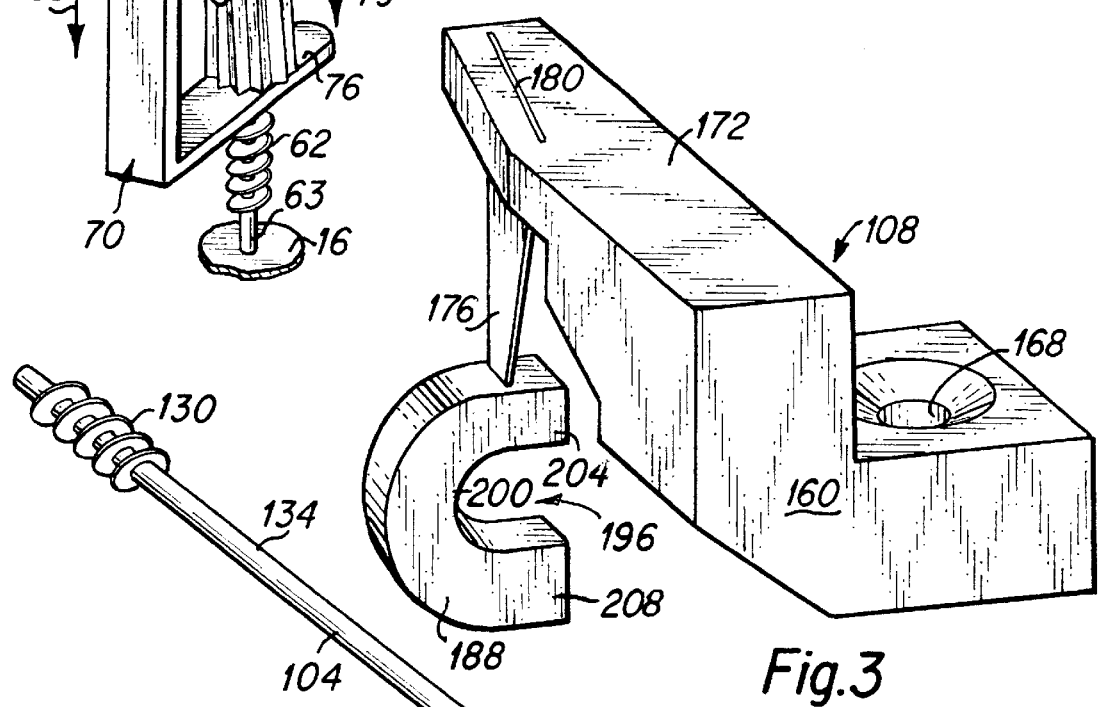
Fig.2
Fig.3

COMPLIANT WORM GEAR AND WORM GEAR BRACKET

BACKGROUND OF THE INVENTION

1. Field of the Invention

The present invention relates generally to geared mechanical linkages for motor driven device components, and more particularly to a compliant worm gear and worm gear bracket for the engagement of a motor with a helical gear within a tape drive system

2. Description of the Prior Art

The compliant worm gear and worm gear support bracket is particularly adapted for controlling the movement of a read/write tape head within a tape drive device, however, it is applicable and useful within generalized light duty motor drive systems. The preexisting geared linkage, to which the present invention is an improvement, includes a motor, a worm gear having an extended shaft, and a separate flexible, cylindrical coupler that joins the motor shaft to the worm gear shaft. A support bracket having a leaf spring controlled bearing disposed within the bracket is utilized to rotatably support the worm gear shaft, such that the worm gear is held in a driving engagement with a helical gear. The helical gear is threadably engaged upon a stationary, threaded rod and also operably engaged within a tape drive head support structure. The linkage functions such that rotation of the worm gear causes rotation of the helical gear, and rotation of the helical gear causes lateral (axial) movement of the helical gear along the stationary threaded rod, resulting in corresponding axial movement of the tape drive head support structure. Further details of this prior art geared linkage are provided herebelow with the aid of FIG. 1.

SUMMARY OF THE INVENTION

The present invention constitutes an improvement upon the prior art geared linkage described above, in that the flexible, cylindrical coupler previously utilized to engage the motor shaft with the worm gear shaft is eliminated. The shaft of the worm gear of the present invention is composed of a sufficiently flexible material to operably correct minor misalignments between the worm gear shaft direction and the motor shaft direction, and to accommodate minor misalignments between the worm gear and the helical gear interface, such that the flexible coupler of the prior art is no longer required. Additionally, the improved worm gear support bracket of the present invention includes a robust, flat, leaf spring which provides sufficient lateral force against the worm gear shaft to maintain a driving engagement between the worm gear and the helical gear. The leaf spring has improved stiffness in the two other in-plane directions of movement (axial and vertical) to provide improved support for the worm gear shaft, while axial loads on the shaft are supported by the motor bearings. The worm gear support bracket also includes a worm gear shaft engagement bushing which provides a support for the worm gear shaft against the helical gear while facilitating a simplified assembly of the geared linkage. Two bushing embodiments are provided; a C-shaped bushing and a cylindrical bushing, each having differing properties and advantages.

It is an advantage of the mechanical linkage of the present invention that it has fewer parts and is easier to assemble than the prior art linkage.

It is another advantage of the mechanical linkage of the present invention that it is less expensive than the prior art mechanical linkage.

It is a further advantage of the mechanical linkage of the present invention that it includes a worm gear shaft support bracket that is compliant in one direction to urge the worm gear into engagement with a helical gear, and stiff in other directions to prevent backlash and disengagement of the worm gear with the helical gear.

It is yet another advantage of the mechanical linkage of the present invention that it utilizes a simple, effective C-shaped bushing embodiment that holds the worm gear in operative engagement with the helical gear, allowing easy assembly.

It is yet a further advantage of the mechanical linkage of the present invention that it includes a drive motor shaft engagement bore formed in the distal end of the worm gear shaft to create a frictional interference fit between the drive motor shaft and the worm gear shaft.

It is still another advantage of the mechanical linkage of the present invention that it includes a cylindrical bushing embodiment that more securely engages the worm gear shaft with the support bracket.

It is an advantage of the tape drive of the present invention that it includes a tape head actuator including a mechanical linkage that has fewer parts and is easier to assemble than the prior art linkage.

It is another advantage of the tape drive of the present invention that it includes a tape head actuator including a mechanical linkage that is less expensive than the prior art mechanical linkage.

It is a further advantage of the tape drive of the present invention that it includes a tape head actuator including a mechanical linkage that includes a worm gear shaft support bearing that is compliant in one direction to urge the worm gear into engagement with a helical gear, and stiff in other directions to prevent backlash and disengagement of the worm gear with the helical gear.

It is yet another advantage of the tape drive of the present invention that it includes a tape head actuator including a mechanical linkage that utilizes a simple, effective C-shaped bushing embodiment that holds the worm gear in operative engagement with the helical gear.

It is yet a further advantage of the tape drive of the present invention that it includes a tape head actuator including a mechanical linkage that includes a drive motor shaft engagement bore formed in the distal end of the worm gear shaft to create a frictional interference fit between the drive motor shaft and the worm gear shaft.

It is still another advantage of the tape drive of the present invention that it includes a tape head actuator including a mechanical linkage that it includes a cylindrical bushing embodiment that more securely engages the worm gear shaft with the support bracket.

These and other features and advantages of the present invention will no doubt become apparent to those skilled in the art upon reading the following detailed description which makes reference to the several figures of the drawings.

IN THE DRAWINGS

FIG. 1 is a perspective view depicting a prior art geared linkage to which the present invention is an improvement;

FIG. 2 is a perspective view of the worm gear of the present invention;

FIG. 3 is a perspective view of the worm gear shaft support bracket of the present invention;

DETAILED DESCRIPTION OF THE PREFERRED EMBODIMENTS

Figure 4:
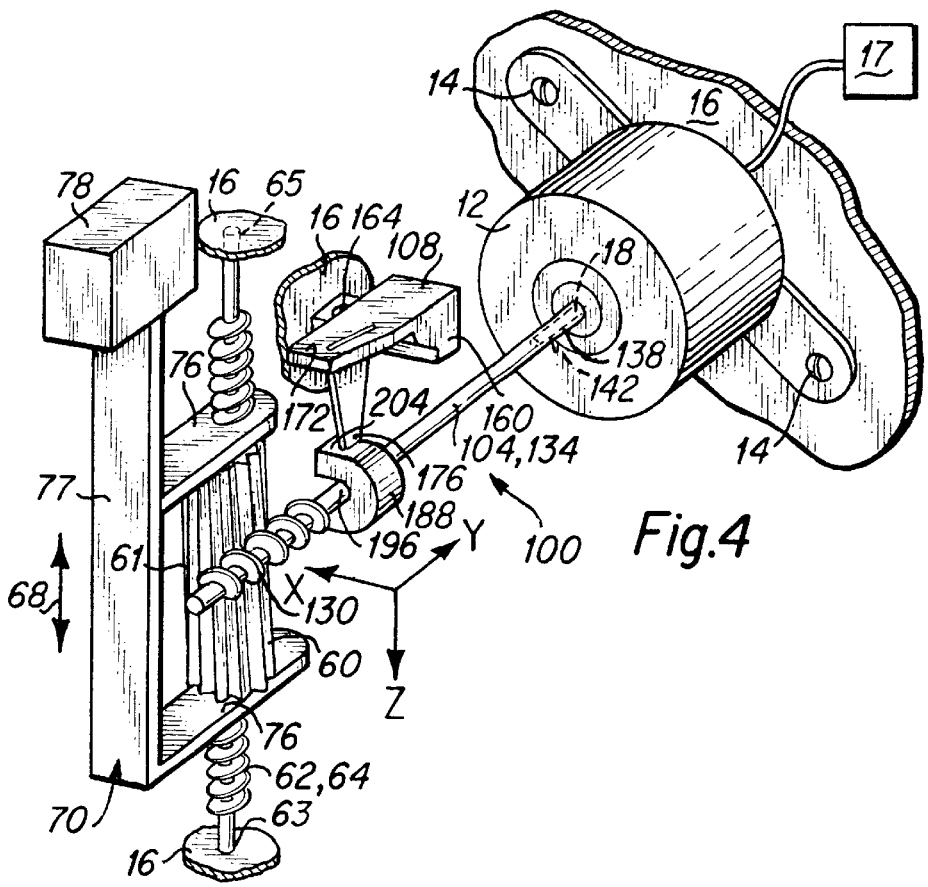
FIG. 4 is a perspective view of the geared linkage of the present invention.

The present invention is a geared linkage that is particularly adapted for the engagement of a drive motor to the actuator shaft of a magnetic tape head of a tape drive system; however, it is generally applicable to similar light duty geared linkage systems. A prior art tape head drive system linkage is depicted in perspective view in FIG. 1, and is next described to provide a fuller understanding of the present invention.

As depicted in FIG. 1, the prior art magnetic head control system linkage 10 includes a drive motor 12 that is engaged by screws 14 to the frame structure 16 of the tape drive. The motor 12 is electrically engaged to a tape drive control system 17. The projecting shaft 18 of the motor is engaged to an extended shaft portion 22 of a worm gear 26 utilizing a flexible coupler 30. The coupler 30 has a central bore into which the motor shaft 18 and the distal end of the worm gear shaft 22 are inserted. A motor shaft engagement screw 42 and a worm gear shaft engagement screw 44 project radially into the coupler, such that the coupler 30 may be engaged to the motor shaft 18 and the worm gear shaft 22 by tightening the screws 42 and 44 respectively. The coupler 30 is designed to be flexible using a flexible material, such that slight misalignments between the worm gear shaft and the motor shaft 18 are compensated for by the flexible coupler 30.

The helical gear 60 includes external helical gear teeth 61 that are adapted for engagement with the worm gear 26, such that rotation of the worm gear 26 causes rotation of the helical gear 60. The helical gear 60 is threadably engaged upon threads 62 of a threaded rod 64 through a threaded bore (not shown) formed axially through the helical gear 60. The lower end 63 and upper end 65 of the threaded rod 64 are fixedly engaged to the frame structure 16 of the tape drive. Additionally the helical gear 60 is mounted in a tape drive head support structure 70 that includes two flanges 76 which are engaged to a tape head actuator member 77 that is movable in the direction (see arrow 68) that is parallel to the axis of the rod 64. The tape drive head 78 is mounted to the actuator member 77, such that movement of the actuator member causes movement of the tape drive head 78. It is therefore to be understood that rotation of the worm gear 26 will cause rotation of the helical gear 60, and rotation of the helical gear 60 will cause it to move (see arrow 79) along the rod 64 due to the threaded engagement of the helical gear 60 with the threads 62 of the rod 64. Movement of the helical gear 60 will cause corresponding movement of the tape drive head support structure through the flanges 76 disposed at either end of the helical gear 60, which will cause corresponding movement 68 of the actuator member, whereby the tape drive head will move in a corresponding manner.

A worm gear shaft support bracket 80 is mounted to the tape drive frame 16, such as with a screw 82, to support the worm gear shaft 22 proximate the distal end shaft engagement with the coupler 30. The bracket 80 includes a worm gear shaft bearing 84 for the rotatable support of the worm gear shaft 22 therewithin, and a formed flat spring 88 is mounted within the bracket 80 to urge the bearing 84 and the worm gear shaft supported therein laterally, such that the worm gear 26 is operably meshed with the helical gear 60.

The prior art worm gear linkage depicted in FIG. 1 is unnecessarily cumbersome and expensive. Specifically, the coupler 30 is a relatively expensive component that requires assembly time to properly install, and is a source of potential equipment malfunction. Additionally, the worm gear support bracket 80 is unnecessarily complex and its lateral support of the worm gear shaft 22 can be improved. The present invention, as described and depicted herebelow comprises an improved worm gear and worm gear support bracket.

The improved geared linkage 100 of the present invention is depicted in FIGS. 2–4, wherein FIG. 2 is a perspective view of an improved worm gear 104, FIG. 3 is a perspective view of an improved worm gear shaft support bracket assembly 108, and FIG. 4 is a perspective view depicting the improved gear linkage 100 of the present invention, including the worm gear 104 of FIG. 2 and the support bracket assembly 108 of FIG. 3.

As depicted in FIG. 2, the worm gear 104 of the present invention is an integrally molded piece, including a worm gear head 130 and an extended worm gear shaft 134 which projects from the worm gear head to a distal end 138. A drive motor shaft engagement bore 142 is formed in the distal end 138 of the worm gear shaft 134 for a press interference fit frictional engagement of the drive motor shaft 18 therewithin. Particularly, the motor shaft engagement bore 142 is formed with a bore diameter that is slightly smaller than the drive motor shaft 18, such that the drive motor shaft 18 is securely frictionally engaged within the worm gear shaft bore 142. The worm gear 104 is preferably integrally molded from a strong, resilient material such as Nylon 6/6, or other similar polymer, for toughness, durability and flexibility, whereby the worm gear shaft 134 is flexible enough throughout its length to compensate for minor misalignments between the drive motor shaft 18 and the engagement of the worm gear head 130 with the helical gear 60, without putting too much bearing load on the motor 12, as is best seen in FIG. 4. Thus, the worm gear head 130 is meshed with the teeth 61 of the helical gear 60 to drive the helical gear 60 in a substantially identical manner as was described hereabove with regard to the prior art geared linkage 10 depicted in FIG. 1. Additionally, the threaded engagement of the central bore of the movable helical gear 60 with the rod 64 and it is substantially identical to the prior art device 10 described hereabove.

A first embodiment of the worm gear shaft support bracket assembly 108 of the present invention is depicted in perspective view in FIGS. 3 and 4. As depicted therein, the bracket assembly 108 includes a support body 160 that is engagable to the tape drive frame 16 through the use of a mounting screw 164 that projects through a mounting screw hole 168 formed in the support body 160. The support body 160 includes an arm portion 172 to which a flat, leaf spring 176 is engaged at a first end 180 thereof. A generally C-shaped bushing member 188 is engaged to a second end 192 of the leaf spring 176. The C-shaped bushing member 188 includes a central, generally U-shaped slot 196 having a curved inner surface 200 having a diameter which is approximately equal to the diameter of the worm gear shaft 134. Thus, the inner surface 200 of the slot 196 acts as a supporting bushing surface for the worm gear shaft 134, which is held therewithin, as depicted in FIG. 4. In the preferred embodiment, the upper 204 and lower portions 208 of the C-shaped bushing 188 are extended beyond a half circle arc to provide an extended surface for holding the worm gear shaft 134 within the bushing slot 196. The inner surface 200 of the slot 196 is preferably fabricated with a convex contour, much like a saddle, such that the worm gear shaft can be slightly misaligned with respect to the axis of the C-shaped bushing, and still operably function to support the worm gear shaft therewithin. It is to be understood that the specific shape of the support 160 is not a significant feature of the present invention.

A preferred method for manufacturing the bracket 108 is in a single step molding process, wherein the support 160 and the C-shaped bushing member 188 are composed of the same material and the leaf spring 176 is a mold insert. A preferred material for fabricating the C-shaped bushing is Delrin AF 500, or other similar material, for providing a low coefficient of friction between the worm gear shaft and the bushing, thus decreasing the bushing bearing load.

Figures 5, 6:
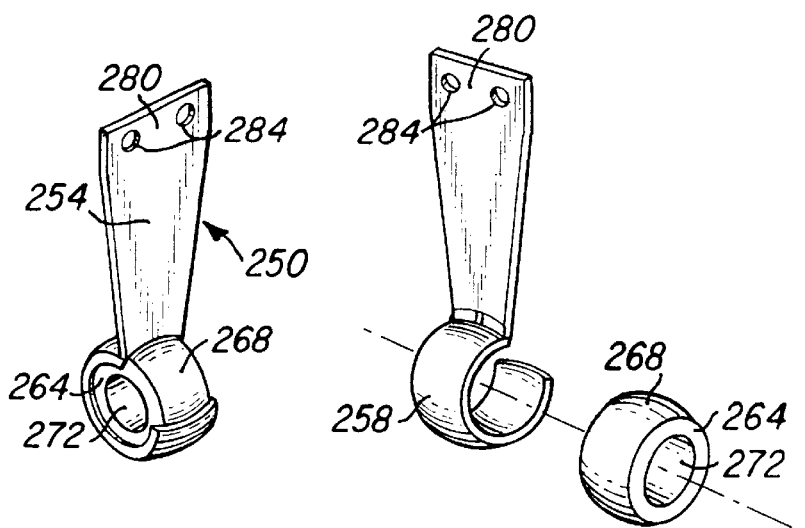
FIG. 5 is a perspective view of an alternative bushing assembly of the present invention.
FIG. 6 is a perspective assembly view of the bushing assembly depicted in FIG. 5.

An alternative bushing assembly of the present invention is depicted in FIGS. 5 and 6, wherein FIG. 5 is a perspective view and FIG. 6 is a perspective assembly view thereof As depicted in FIGS. 5 and 6, the bushing assembly 250 includes a flat, leaf spring 254 having a generally C-shaped bushing engagement end 258. A generally cylindrical bushing 264, having a generally convex curved outer surface 268 and an axial worm gear shaft support bore 272 formed therethrough, is fabricated for a tight frictional engagement within the end 258 of the leaf spring 254, as is shown in FIG. 6. The end 258 is preferably formed with a concave inner surface that generally matches the convex outer surface 268 of the bushing 264, such that the bushing 264 is prevented from rotating in the spring end 258 due to the spring pressure clamping of the bushing 264 within the end 258. The upper end 280 of the leaf spring 254 is formed for engagement with a support body, such as support body 160 depicted and described hereabove, such as through mounting bores 284 by which the spring 254 is mountable (utilizing screws not shown) to the support body 160. The alternative bushing assembly 250 more reliably holds the worm gear together with the support bracket assembly, and it can generally accommodate larger angular misalignments than the bushing assembly depicted in FIGS. 3 and 4, while still providing excellent alignment and engagement of the worm gear with the helical gear.

A further feature of the worm gear linkage 100 of the present invention is the location and orientation of the worm gear support bracket 108 relative to the worm gear shaft 134. Specifically, the bracket 108 is mounted such that the cantilevered leaf spring 176 or 254 is pre-loaded to provide a compliant spring force in the X-direction (see FIG. 4) that is perpendicular to the worm gear shaft 134 and directed towards the helical gear 60. That is, the leaf spring 176 or 254 urges the bushing 188 or 264 against the shaft 134 of the worm gear to urge the worm gear head 130 into engagement with the teeth 61 of the helical gear 60. To accomplish this, the plane of the leaf spring is oriented parallel to the central Y axis direction of the worm gear shaft 134. The spring 176 is made from heat-treated steel and is designed to give the intended amount of preload between the worm gear head 130 and the helical gear 60. A further significant feature of the leaf spring 176 is that it is stiff in its in-plane directions, that is, the Z direction and the Y direction. Thus, the bushing 188 or 264 is held stiff in the Y and Z directions by the leaf spring 176 or 254 respectively, while it is compliant in the X direction. This X direction compliance is also significant in maintaining the meshing of the helical gear 60 and the worm gear head 130 where slight misalignments may exist, while the stiffness in the Z direction prevents the worm gear head 130, from flexing during changes in the direction of rotation of the motor 12. This eliminates backlash which would occur if the worm gear shaft 134 were able to move in the Z-direction. Not only is a preload force applied by the leaf spring 176 or 254, but also as the helical gear turns, any runout due to inaccuracies in the construction of the parts, are taken up by the spring. This is an advantage over a typical fixed position gearing system and aids in the elimination of backlash between the worm gear and the helical gear.

Another significant feature of the linkage depicted in FIG. 4 is that the worm gear shaft support bearing 188 or 264 is located proximate the worm gear head 130. This orientation is particularly significant in holding the head 130 in engagement with the helical gear 60 where the worm gear shaft is flexible, as it is designed to be in the worm gear 104 of the present invention, as discussed hereabove.

The present invention is thus a unique method of driving a helical gear with a flexible worm gear shaft and compliant worm gear bracket. The combination of these components allows for a robust, inexpensive, and compact alternative to costly bearings and parts and machined shafts. While the present invention has been shown and described with regard to certain preferred embodiments, it is to be understood that those skilled in the art will no doubt devise certain alterations and modifications in form and detail hereof that nevertheless include the true spirit and scope of the invention. It is therefore intended that the following claims cover all such alterations and modifications hereof which nevertheless include the true spirit and scope of the invention.

What we claim is:

1. A mechanical linkage comprising:
   a worm gear having a threaded head portion and an extended shaft portion, said shaft portion being operably engagable with a shaft of a drive motor;
   a helical gear being operably engaged with said head portion of said worm gear;
   a support bracket being disposed proximate said worm gear shaft and including a bushing to engage and support said shaft of said worm gear;
   wherein said support bracket further includes a support body portion and a leaf spring, and wherein a first end of said leaf spring is engaged to said support body portion, and wherein said bushing is engaged to a second end of said leaf spring.

2. The mechanical linkage as described in claim 1, wherein said leaf spring is formed as a flat, planar member, wherein said plane of said leaf spring is generally parallel to an axial direction of said worm gear shaft.

3. The mechanical linkage as described in claim 2, wherein said bushing is disposed proximate said head of said worm gear.

4. The mechanical linkage as described in claim 3, wherein said bushing includes a C-shaped opening for holding said shaft therewithin, and wherein said C-shaped opening includes extended upper and lower surfaces thereof.

5. The mechanical linkage as described in claim 3, wherein said bushing is generally cylindrically shaped and includes a bore formed therethrough for holding said shaft therewithin.

6. The mechanical linkage as described in claim 1, wherein said worm gear shaft has a distal end having a motor shaft holding bore formed therein, wherein said motor shaft has a diameter and said worm gear shaft bore has a diameter, and wherein said worm gear shaft bore diameter is approximately equal to said motor shaft diameter, such that said worm gear shaft is engagable upon said motor shaft with a frictional interference fit.

7. A tape drive comprising:
   a tape drive frame;

a tape drive head support structure having a tape drive head engaged thereto, said tape drive head support structure being movably engaged to said tape drive frame;

a threaded rod being fixedly engaged to said tape drive frame;

a helical gear having a threaded central bore, said helical gear being operably engaged with said tape drive head support structure and being threadably engaged with said threaded rod;

a worm gear having a threaded head and an extended shaft, said threaded head being threadably engaged with said helical gear;

a drive motor having a motor shaft, said motor shaft being operably engaged with said worm gear shaft to turn said worm gear upon activation of said motor;

a support bracket assembly being disposed proximate said worm gear shaft and including a bushing that engages and supports said shaft of said worm gear;

wherein said support bracket assembly further includes a support body portion and a leaf spring, and wherein a first end of said leaf spring is engaged to said support body portion, and wherein said bushing is engaged to a second end of said leaf spring.

8. The tape drive as described in claim 7, wherein said leaf spring is formed as a flat, planar member, wherein said plane of said leaf spring is generally parallel to an axial direction of said worm gear shaft.

9. The tape drive as described in claim 8, wherein said bushing is disposed proximate said head of said worm gear.

10. The tape drive as described in claim 9, wherein said bushing includes a C-shaped opening for holding said shaft therewithin, and wherein said C-shaped opening includes extended upper and lower surfaces thereof.

11. The mechanical linkage as described in claim 9, wherein said bushing is generally cylindrically shaped and includes a bore formed therethrough, and wherein said worm gear shaft is disposed within said bore.

12. The tape drive as described in claim 7, wherein said worm gear shaft has a distal end having a motor shaft holding bore formed therein, wherein said motor shaft has a diameter and said worm gear shaft bore has a diameter, and wherein said worm gear shaft bore diameter is approximately equal to said motor shaft diameter, such that said worm gear shaft is engagable upon said motor shaft with a frictional interference fit.

* * * * *